(12) United States Patent
Hwang

(10) Patent No.: US 9,898,707 B2
(45) Date of Patent: Feb. 20, 2018

(54) VALIDATION OF END-ITEM COMPLETENESS FOR PRODUCT DEMANDS

(71) Applicant: Dassault Systemes DELMIA Corp., Auburn Hills, MI (US)

(72) Inventor: Moon Ho Hwang, Rochester Hills, MI (US)

(73) Assignee: Dassault Systemes Americas Corp., Waltham, MA (US)

( * ) Notice: Subject to any disclaimer, the term of this patent is extended or adjusted under 35 U.S.C. 154(b) by 288 days.

(21) Appl. No.: 14/108,023

(22) Filed: Dec. 16, 2013

(65) Prior Publication Data

US 2015/0170082 A1 Jun. 18, 2015

(51) Int. Cl.
*G06Q 10/06* (2012.01)
*G06Q 10/08* (2012.01)

(52) U.S. Cl.
CPC ....... *G06Q 10/06315* (2013.01); *G06Q 10/06* (2013.01); *G06Q 10/08* (2013.01); *G06Q 10/0875* (2013.01)

(58) Field of Classification Search
CPC .................................................. G06Q 10/06
USPC ...................................................... 705/7.25
See application file for complete search history.

(56) References Cited

U.S. PATENT DOCUMENTS

| | | | |
|---|---|---|---|
| 8,099,480 B1 | 1/2012 | Muthusrinivasan et al. | |
| 8,578,389 B1 | 11/2013 | Boucher | |
| 2002/0087440 A1 | 7/2002 | Blair et al. | |
| 2003/0120651 A1 | 6/2003 | Bernstein et al. | |
| 2003/0220852 A1 | 11/2003 | Back et al. | |
| 2004/0061715 A1 | 4/2004 | Chu et al. | |
| 2004/0133502 A1* | 7/2004 | Sadre | G06Q 10/06 705/37 |
| 2004/0230583 A1 | 11/2004 | Testa | |
| 2004/0243491 A1 | 12/2004 | Hsiang | |
| 2005/0154704 A1 | 7/2005 | Yuda et al. | |
| 2005/0160411 A1* | 7/2005 | Sangal | G06F 8/20 717/144 |
| 2005/0177479 A1 | 8/2005 | Wei | |
| 2005/0192783 A1 | 9/2005 | Lystad et al. | |
| 2005/0203718 A1* | 9/2005 | Carek | G06N 5/02 703/1 |
| 2009/0240723 A1 | 9/2009 | Engle et al. | |
| 2010/0030767 A1 | 2/2010 | Kim et al. | |
| 2011/0077763 A1 | 3/2011 | Harrer | |
| 2011/0145760 A1* | 6/2011 | Radet | G06F 3/04815 715/810 |

(Continued)

OTHER PUBLICATIONS

European Search Report of EP14196350.4-1958 dated Apr. 5, 2015 entitled "Validation of End-Item Completeness for Product Demands".

(Continued)

*Primary Examiner* — Kurtis Gills

(74) *Attorney, Agent, or Firm* — Hamilton, Brook, Smith & Reynolds, P.C.

(57) ABSTRACT

Computer method and apparatus in a PLM system defines completeness of an end-item set for a given product demand set. The BOM for the product demand set is represented in a tree-based graph structure. Completeness of end-items is determined and/or validated such that one can build the target product set from the set of end-items. Shared items, parts and subassemblies of the given product are taken into account.

20 Claims, 12 Drawing Sheets

WORKFLOWS OF INVENTION

(56) References Cited

U.S. PATENT DOCUMENTS

| | | | |
|---|---|---|---|
| 2011/0173103 A1 | 7/2011 | Batra et al. | |
| 2011/0246256 A1* | 10/2011 | Zhu | G06Q 10/06 705/7.23 |
| 2012/0109789 A1* | 5/2012 | Bhatt | G06Q 10/0875 705/29 |
| 2012/0130521 A1 | 5/2012 | Kohlhoff | |
| 2014/0067468 A1* | 3/2014 | Marwaha | G06Q 10/04 705/7.31 |
| 2014/0304030 A1* | 10/2014 | Bryan | G06Q 10/063 705/7.28 |

OTHER PUBLICATIONS

Sole, M. "Process Mining from a Basis of State Regions," In: Lilius J., Penczek W. (Eds.), "Applications and Theory of Petri Nets" 31$^{st}$ International Conference, Petri Nets, Braga, Portugal, pp. 226-245 (2010).

W.M.P. Van Der Aalst, "Designing workflows based on product structures," Department of Mathematics and Computing Science, Eindhoven University of Technology, Eindhoven, The Netherlands, pp. 1-6 (1997).

\* cited by examiner

EXCLUSIVE AND NON-EXCLUSIVE ANCESTORS

EXCLUSIVE AND NON-EXCLUSIVE ANCESTORS IN V1-9

RELATIONSHIP BETWEEN ExclusiveDesc(B) AND NON ExclusiveDesc(B)

VALIDATION OF END-ITEM COMPLETENESS FOR PRODUCT DEMANDS

BACKGROUND OF THE INVENTION

Global computer networks, such as the Internet, have provided new computing platforms and applications (including software application design). For example, internet scale distributed computing provides so-called network as platform computing. The network as platform allows applications (configured as web-enabled applications), to be run entirely through a browser. Further, the network as platform allows users across or within various roles to collaborate.

An industry example of computer implemented programs and collaborative systems using network as platform is Product Lifecycle Management (PLM) Systems. PLM solutions refer to a business strategy that helps companies to share product data, apply common processes, and leverage corporate knowledge for the development of products from conception to the end of their life, across the concept of extended enterprise. According to this concept, a company is made up not just of its company departments but also of other actors such as business partners, suppliers, Original Equipment Manufacturers (OEM), and customers. By including these actors, PLM may allow this network to operate as a single entity to conceptualize, design, build, and support products and processes.

Amongst the PLM solutions are the computer-aided techniques, which are known to include Computer-Aided Design (CAD). Computer-Aided Design relates to software solutions for authoring product design. Similarly, CAE is an acronym for Computer-Aided Engineering, e.g. it relates to software solutions for simulating the physical behavior of a future product. CAM stands for Computer-Aided Manufacturing and typically includes software solutions for defining manufacturing processes and operations. Some PLM solutions make it possible, for instance, to design and develop products by creating digital mockups (a 3D graphical model of a product). The digital product may be first defined and simulated using an appropriate application. Then, the lean digital manufacturing processes may be defined and modeled.

For example, generally, known PLM solutions provide means for organizing product engineering knowledge, managing manufacturing engineering knowledge, and enabling enterprise integrations and connections into both the engineering and manufacturing knowledge centers. All together the system delivers an open object model linking products, processes, resources to enable dynamic, knowledge-based product creation and decision support that drives optimized product definition, manufacturing preparation, production and service.

Such PLM solutions comprise a relational database of products. The database comprises a set of textual data and relations between the data. Data typically include technical data related to the products said data being ordered in a hierarchy of data and are indexed to be searchable. The data are representative of the modeled objects, which are often modeled products and processes.

PLM information, including product configuration, process knowledge and resources information are typically intended to be edited in a collaborative way. For instance, a team of designers working in a collaborative way may individually contribute to design a product by accessing shared information related to the product from remote sites through web-enabled applications. Each user or remote site is separately registered with the system platform and each is responsible for implementing a respective set of web-server services for the application(s) of this project. Although a user may have existing web services originally implemented for other applications, there is no mechanism to reuse or share these web services for the current project. There is a need for users at a client or applications of the platform to copy or otherwise leverage off existing web services.

Currently, many companies try to remain competitive by providing a variety of product portfolios to different groups of customers, and also by reducing the total costs of purchasing and production.

Since the product portfolios are changing over time as market trends do, the product and/or manufacturing designers need to decide which parts or subassemblies—called end items—are going to be purchased to productize the portfolios.

SUMMARY OF THE INVENTION

Embodiments of the present invention address the foregoing problems in the art. One key method or approach for increasing or maintaining the numbers of portfolios while reducing costs is to share as many parts across the portfolios as realistic. Given this, the structures of PLM (product life-cycle management) products are not "trees" but "networks" (especially "acyclic directed graphs") in which one part can be shared by many parent subassemblies or products.

Embodiments pose the set of product portfolios as being given by a PLM structure in which hierarchical relationships indicate how a sub-assembly (or a product) consists of its child parts. The PLM structure provides the sharing parts concept by allowing for the shared part to have multiple parents. Therefore, it is not trivial to figure out the purchasing of which parts allows one to produce the given set of product portfolios.

The present invention defines completeness of an end-item set for a given set of product portfolios (i.e., product demand). Completeness of end-items is checked such that, one can build the target product from the end-items taking into account the shared parts or subassemblies under the product.

Embodiments provide computer method, apparatus and system for validating completeness of end-items and sharing items across PLM products. Methods embodying the present invention comprise:

for a given set of products in a PLM system, the given set of products having a corresponding Bill of Material (BOM), representing the BOM in a tree-based graph as a hierarchy of product-items, subassemblies, child parts and initial end-items for constructing the products in the given set;

determining a first working set of product items and of end-items not exclusively related to initial end-items;

identifying end-items in the first working set that are represented by leaf nodes in the graph;

combining the identified end-items and initial end-items of the given set of products, said combining resulting in a complete set of end-items for the given set of products; and outputting an indication of the complete set in a manner enabling sharing of elements in the PLM system across the given set of products.

In the first working set, the end-items not exclusively related to initial end-items are end-items outside of the set of items exclusively related to the initial end-items.

A complete-set validation engine or PLM system processor implements the steps of: determining a first working set; identifying end-items in the first working set; combining the identified end-items, and outputting an indication of the complete set.

In embodiments, the tree-based graph is an acyclic directed graph. The graph represents product items as vertices or nodes. And the graph represents end-items as vertices and nodes.

Further, in embodiments, root nodes of the graph represent respective product items of the products in the given set of products. The first working set is determined by an intersection of: (i) a product item set containing the product items and elements corresponding to descendent nodes of the root nodes representing the product items, and (ii) a difference set containing elements that correspond to nodes of the graph that are not in a union set of the initial end-items, exclusive ancestors of the initial end-items and exclusive descendents of the initial end-items.

Embodiments enable a user of the PLM system to use the complete set in purchasing elements for producing the products. The complete set takes into account shared end-items.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
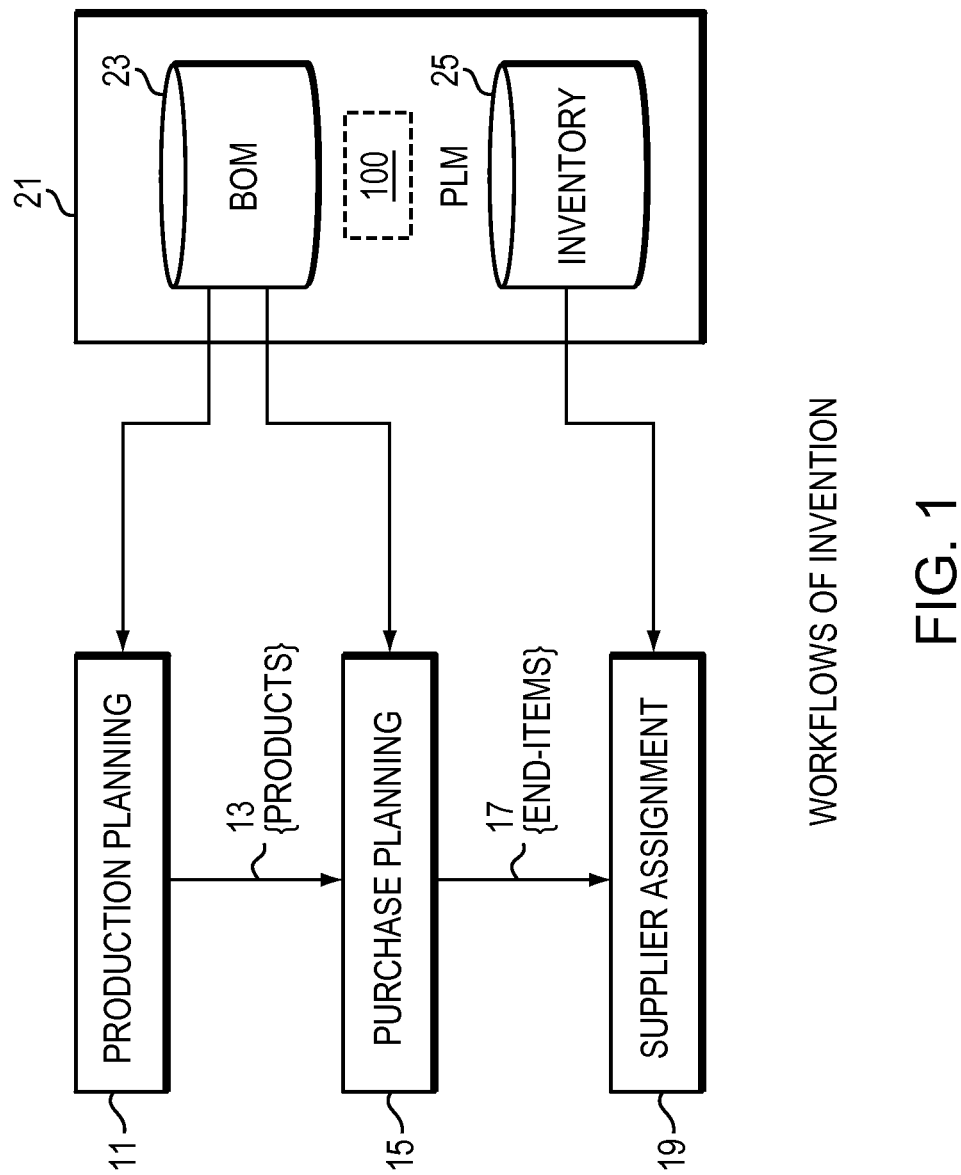
FIG. 1 is a workflow diagram of embodiments of the present invention.

As shown in FIG. 1, once having a product plan 11 that defines products to be produced 13, one may have a simple and critical question: "Which items will we build to develop the products and which items do we need to purchase?" This leads to purchase planning 15 and inventory management 25. The answer to this question is called the "completeness of end-items 17." As can be seen in FIG. 1, the complete set of end-items will be assigned as orders to suppliers 19. The present invention focuses on an apparatus and method 100 to validate completeness of end-items 17 based on a fundamental structure of PLM systems 21, called Bill-of-Material (BOM) 23. An end-item is a manufactured product that can be put to use without further work being done on it.

1. Conceptual Foundation: BOM 23

1.1 BOM Structure of PLM 21

In some embodiments, BOM structures 23 present child structures of each assembly (to become an end-item 17 or part thereof). Mathematically, a BOM is represented as a directed acyclic graph $G=(V,E)$ where V is a set of vertices; $E \subseteq V \times V$ is a set of directed edges in which, if there exists $(v_1, v_2) \in E$, then $v_1$ is called a parent of $v_2$, while $v_2$ is called a child of $v_1$.

1.2 Hierarchical Sets

Suppose that $G=(V,E)$ is a BOM 23 and $v \in V$. Then, $Children(v)=\{v' \in V: (v,v') \in E\}$ and $Parents(v)=\{v' \in V: (v',v) \in E\}$ denotes the children of v and the parents of v, respectively. Based on these definitions, the descendants of v and the ancestors of v are respectively defines as
$Descendants(v)=\bigcup_{v' \in Descendants(v) \cup \{v\}} Children(v)$ and
$Ancestors(v)=\bigcup_{v' \in Ancestors(v) \cup \{v\}} Parents(v)$.

We call a vertex v a "root" and a "leaf" if Parents(v) and Children(v) are empty, respectively.

Figure 2:
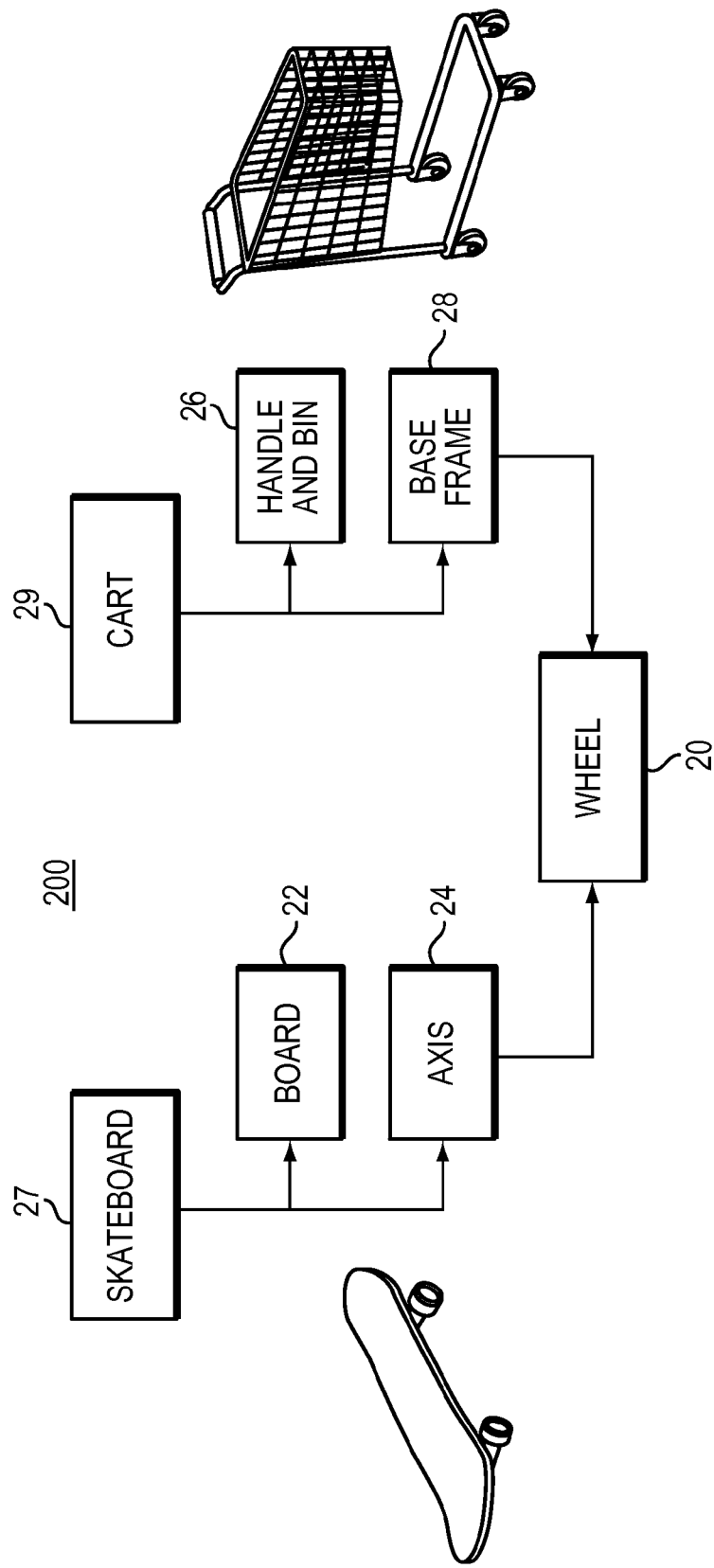
FIG. 2 is a schematic illustration of a bill of material (BOM) for skateboards and carts in an example embodiment.

FIG. 2 shows two classes of products: skateboards and carts. These two products are root nodes 27, 29 of the BOM graph 200. In this diagram, if there is no edge (v1, v2), then v2 does not need to build v1. For example, SkateBord 27 does not need BaseFrame 28 because there is no edge SkateBoard 27 to BaseFrame 28. Regarding hierarchical structures, Children(SkateBoard)={Board, Axis} at 22, 24, Descendants(Cart)={Handle and Bin, BaseFrame, Wheel} at 26, 28, 20 respectively, Parents(Wheel)={Axis, BaseFrame} at 24, 28, Ancestors(Wheel)={Axis, SkateBoard, Base Frame, Cart} at 24, 27, 28 and 29, for example.

Figure 3:
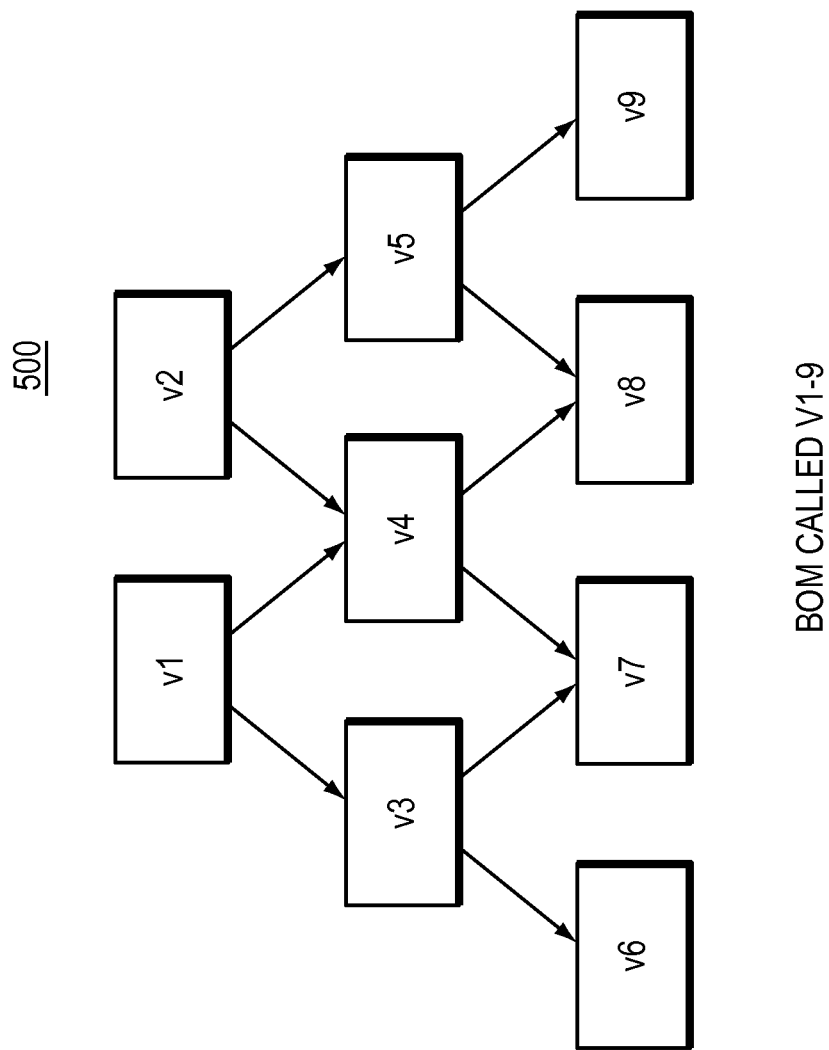
FIG. 3 is another schematic of an example BOM, this one being called V1-9.

Shown in FIG. 3 is another example BOM graph 500 having a hierarchical structure in which Children(v1)={v3, v4};

Parents(v4)={v1, v2};

Siblings(v4)={v3, v5};

Vertex v1 and v2 are roots, while v6, v7, v8, v9 are leaves;

Descendants(v1)={v3,v4,v6,v7,v8}; and

Ancestors(v8)={v4,v1,v5,v2}.

The functions Children, Parents, Descendants, and Ancestors can be extended to take a set of vertexes as Children$(B)=\bigcup_{(v \in B)} Children(v)$, Parents$(B)=\bigcup_{(v \in B)} Parents(v)$, Descendants$(B)=\bigcup_{(v \in B)} Descendants(v)$, and Ancestors$(B)=\bigcup_{(v \in B)} Ancestors(v)$ from now on. For example, let $B=\{v4,v5,v7\}$ of FIG. 3. Then, Children(B)={v8,v9} and Parents(B)={v1,v2,v3}.

2. End-Items, Product-Items, and Completeness

An end-item is a manufactured product that can be put to use without further work being done on it. The embodiments described herein clarify whether a set of end-items 17 guarantees to build a set of products 13. The embodiments described herein refer to a vertex of a BOM structure 23 as "an item." These terms are interchangeable with each other throughout this description.

Given a vertex set $B \subseteq V$ of BOM $G=(V,E)$, let ExclusiveAnces(B) denote the exclusive ancestors of B such that
ExclusiveAnces$(B)=\{v \in Ancestors(B): Children(v) \subseteq ExclusiveAnces(B) \cup B\}$.

In words, the set of exclusive ancestors of a given item B is written as term "ExclusiveAnces(B)" and covers every ancestor v of each element of B if v has children that are also included by ExclusiveAnces(B).

An end-item set $B \subseteq V$ is called complete for a product-item set $T \subseteq V$ if $T \subseteq$ ExclusiveAnces(B).

Suppose that BOM 200 includes Skateboards 27 and Carts 29, as shown in FIG. 2, and the product-item T={SkateBoard}. A set of end-items B={Board 22, Axis 24} is complete because $T \subseteq$ {SkateBoard 27}. However two end-item sets B1={Axis 24, Wheel 20} and B1={Handle and Bin 26, BaseFrame 28} are not complete because $T \subset$ ExclusiveAnces(B1)={Axis 24} and $T \subset$ ExclusiveAnces(B2)={Cart 29}.

Assume that for BOM 500 of FIG. 3 and the product-item set is T={v1,v2}. For an end-item set B={v6,v7,v8,v5}, B is complete for T because {v1,v2}=ExclusiveAnces(B)={v1, v2,v3,v4,v5}. However, if B={v6,v7,v5,v9}, B is not complete for T because {v1,v2} $\subset$ {v3,v5}.

3. Making End-Item Sets Complete

In the previous section, it is shown how one can check if an end-item set 17 is complete for making a set of product-items 13. However, if one has an end-item set that is not complete yet for a product-item set, then one has to make it complete by adding a set of missing items. To clarify the missing items, one needs to define several different classes of items.

3.1 Non Exclusive Ancestors

Recall that the set of exclusive ancestors of a given item B ExclusiveAnces(B) covers every ancestor of each element of B whose children items are also included by ExclusiveAnces(B)∪B. There may be some elements of the ancestors of B which are not in ExclusiveAnces(B)∪B. Call this NonExclusive ancestors of B, denoted by NonExclusiveAnces(B). Formally, NonExclusiveAnces(B)=Ancestors(B)\ExclusiveAnces(B) where X\Y={x∈X:x∉Y} indicates set difference.

Notice that each item in NonExclusiveAnces(B) has a child that is not in ExclusiveAnces(B). Due to such a child of v, v itself as well as Ancestors(v) could not be completed by B. In other words, the elements of NonExclusiveAnces(B) could not be built by and from B.

Figure 4:
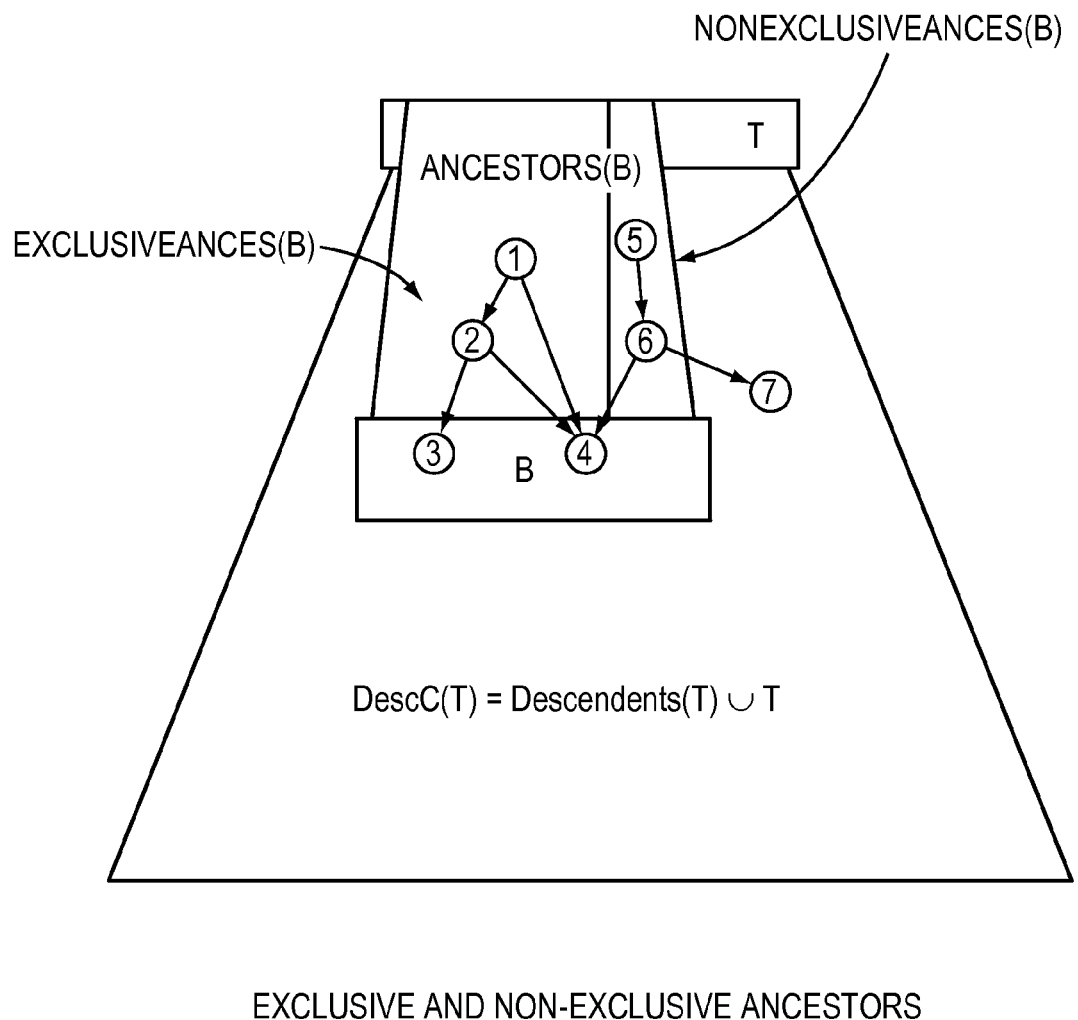
FIG. 4 is a graphical illustration of exclusive and non-exclusive ancestors employed by embodiments.

FIG. 4 illustrates the relationships of items in which B={3,4} and Ancestors(B)={1,2,5,6}. Since vertex 6 has the child vertex 7 which is not in B∪ExclusiveAncestor(B), NonExclusiveAnces(B)={5,6} therefore, ExclusiveAnces(B)={1,2}.

Figure 5:
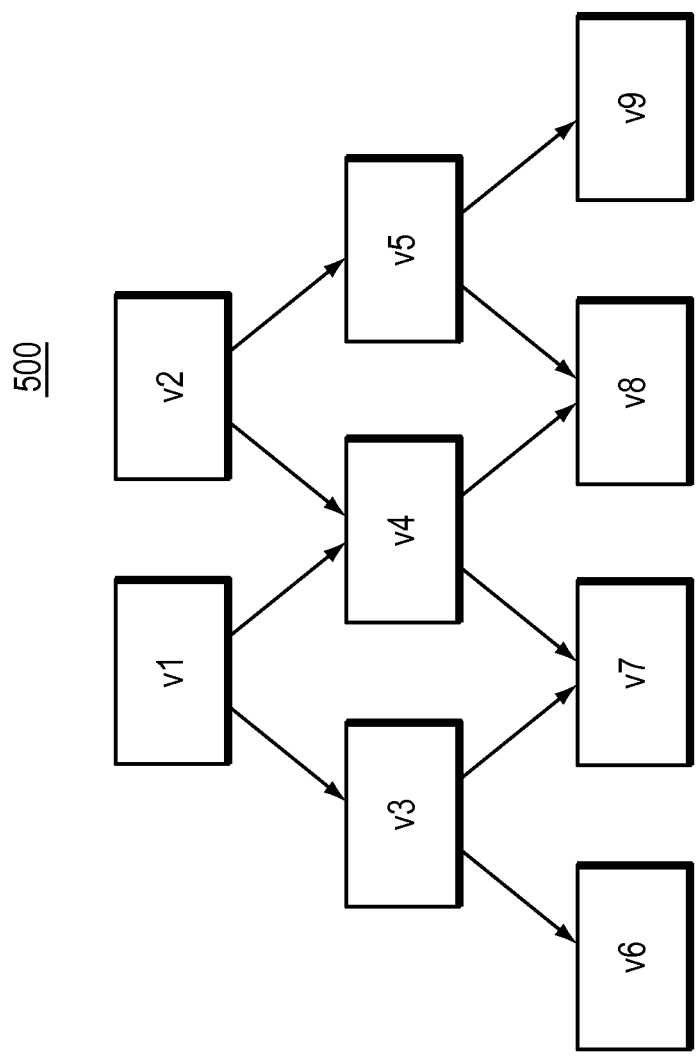
FIG. 5 illustrates application of FIG. 4 ancestors to V1-9 of FIG. 3.

With reference to FIG. 5, assume that an end-item set B={v5,v6,v7,v9} in the BOM V1-9 of FIG. 3. Then all children of v3 (that is v6 and v7) are in ExclusiveAnces(B)∪B, v3 is also in ExclusiveAnces(B). However, v4 is not because its child v8 is not in ExclusiveAnces(B)∪B. Since v4 is in NonExclusiveAnces(B), so are its parents v1 and v2. Thus NonExclusive(B)={v1,v2,v3,v4,v8}.

3.2 Exclusive and NonExclusive Descendants

When examining the descendant side from the similar perspective of ancestors mentioned earlier, when one purchases an item, the subassemblies of that item and the parts of that item come with it. But when handling the PLM BOM in which multiple parents may require a sharing part, one may consider purchasing additional subassemblies or parts because of the child sharing structure. The following two definitions assume that one has a BOM G=(V,E) and a set of end-items $B \subseteq V$.

Exclusive Descendants

The exclusive descendant set of B is ExclusiveDesc(B)={v∈Descendants(B):Parents(v)⊆ExclusiveDesc(B)∪B}denoting that the elements of ExclusiveDesc(B) come with B and one does not have to purchase them for assembling any other parents.

Non-Exclusive Descendants

The non-exclusive descendant set of B is NonExclusiveDesc(B)=Descendants\ExclusiveDesc(B) denoting that the elements of NonExclusiveDesc(B) shared by items which individually are not in ExclusiveDesc(B). This means one has to purchase the elements additionally even though they come with B.

Figure 6:
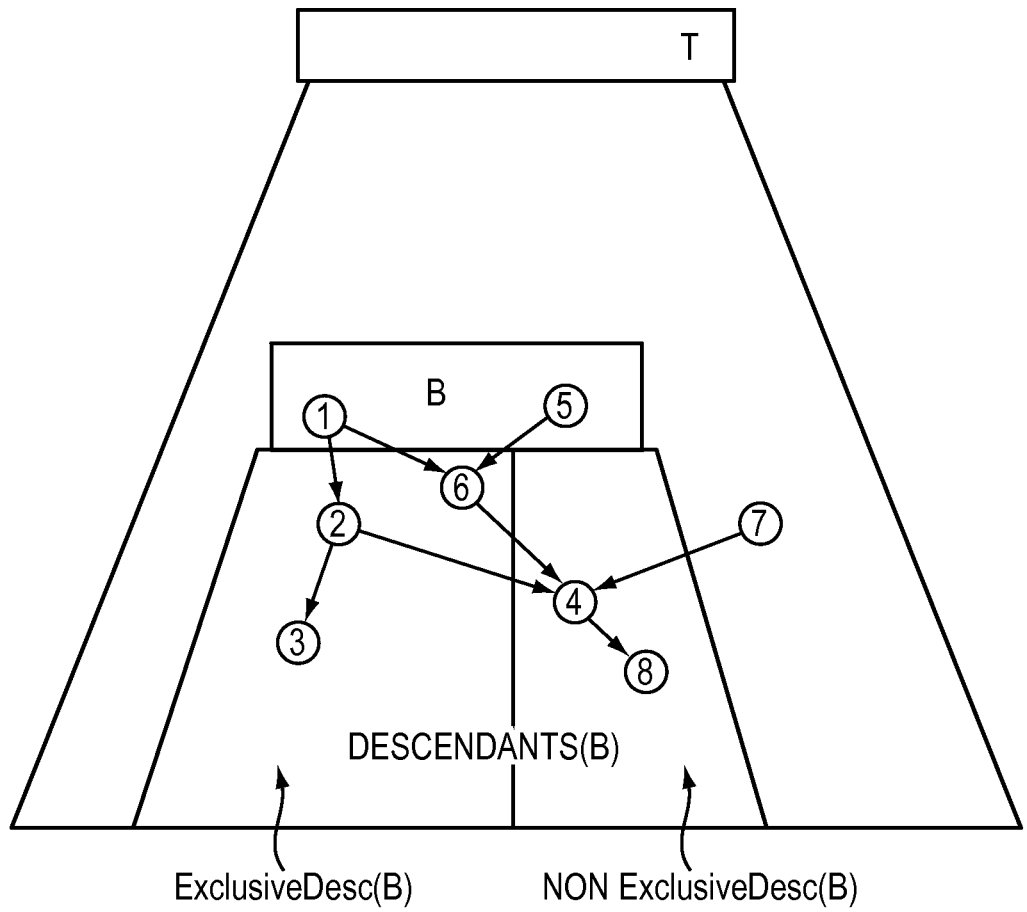
FIG. 6 is a graphical illustration of the relationship between ExclusiveDesc(B) and NonexclusiveDesc(B) employed by embodiments.

FIG. 6 illustrates the relationship between ExclusiveDesc(B) and NonExclusiveDesc(B) for a given end-item set B={1,5}. Among the descendants of B, ExclusiveDesc(B)={2,3,6}, while NonExclusiveDesc(B)={4,8} because the item 4 has the parent 7 which is not in ExclusiveDesc (B) nor B.

This relation is easily found in the Skateboard 27 and Cart 29 example shown in FIG. 2. If the end item set B={Board 22, Axis 24} then Descendants(B)={Wheel 20}, ExclusiveDesc(B)=∅, NonExclusiveDesc(B)={Wheel 20} because the item Base Frame 28 that is a parent of Wheel 20 is not ExclusiveDesc(B) nor B. In other words, if one wants to also make Base Frame 28, one may need to purchase Wheel 20 additionally, even though Wheel will come with Axis 24.

Similarly, for an end-item set B={v5,v6,v7,v9} of BOM 500 shown in FIG. 5, Descendants(B)={v8}, ExcelusiveDesc(B)=∅ and NonExclusiveDesc(B)={v8} which means that one needs to purchase v8 (even if it comes with v5) to make the subassembly v4.

3.3 Making the End-Item Sets Complete

Figure 7:
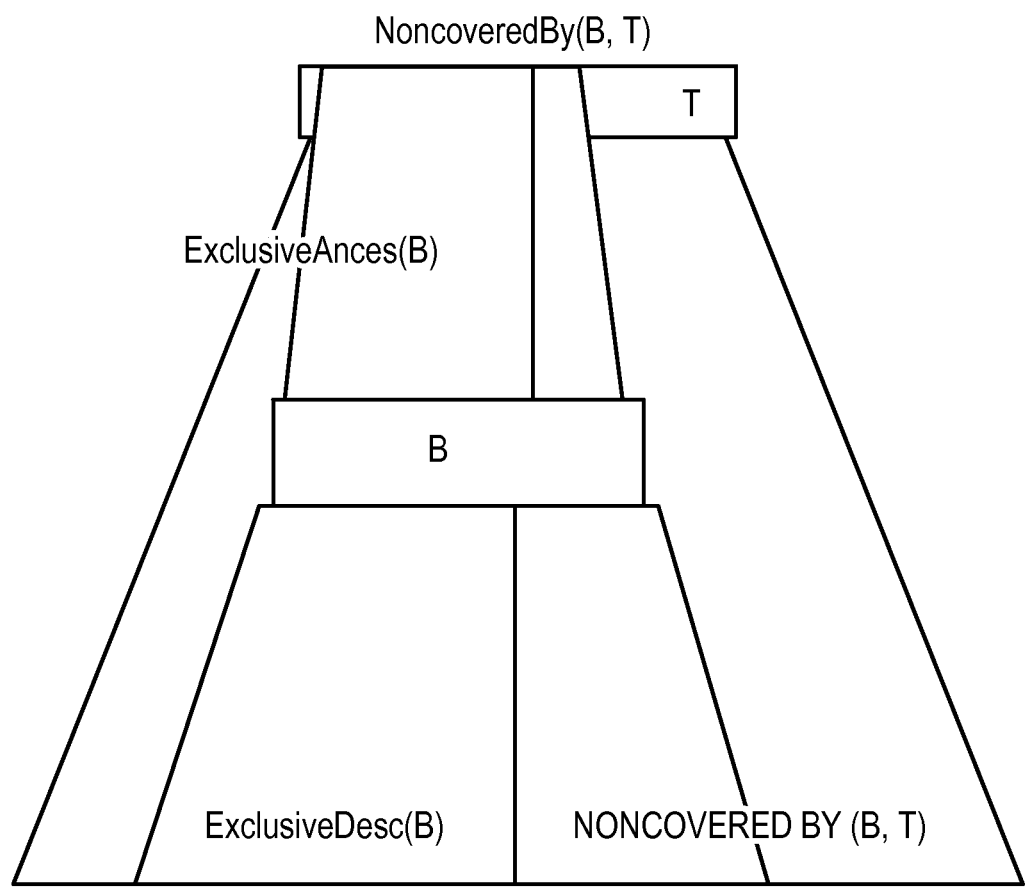
FIG. 7 is a graphical illustration of the relationship between CoveredBy(B, T) and NonCoveredBy(B, T) employed by embodiments.

FIG. 7 illustrates the relationship between CoveredBy(B, T) and Noncoveredby (B,T). To explain, assume that a set of end-items $B \subseteq V$ for a BOM G=(V,E) with a set of product-items $T \subseteq V$, then the items of interest are in T∪Descendants (T) together with two sets:

$$\text{CoveredBy}(B,T) = (T \cup \text{Descendants}(T)) \cap (B \cup \text{ExclusiveAnces}(B) \cup \text{ExclusiveDesc}(B)) \text{ and}$$

$$\text{NonCoveredBy}(B,T) = (T \cup \text{Descendants}(T)) \setminus (B \cup \text{ExclusiveAnces}(B) \cup \text{ExclusiveDesc}(B))$$

Theorem

B is complete if and only if NonCoveredBy(B,T) is empty.

Corollary

Given an end-item set $B \subseteq V$ for a BOM G=(V,E) and a product-item $T \subseteq V$, B=B∪Leaf (NonCoveredBy(B,T)) makes B complete where Leaf (A)={v∈A:v is a leaf} where $A \subseteq V$.

Example of SkateBoards and Carts

Suppose that the BOM G=(V,E) is as shown in FIG. 2 and the end-item set B={Board 22, Axis 24}, and T={Skateboard 27, Cart 29}. NonCoveredBy(B,T)={Cart 29, Handle and Bin 26, Base Frame 28, Wheel 20} and Leaf(NonCoveredBy(B,T))={Wheel 20, Handle and Bin 26}. Therefore, if B=B∪Leaf(NonCoveredBy(B,T))={Board 22, Axis 24, Wheel 20, Handle and Bin 26}, B becomes complete for T.

Example of V1-9

Suppose that the BOM G=(V,E) is as shown in FIG. 5 and the end-item set B={v5,v6,v7,v9}, and T={v1,v2}. NonCoveredBy(B,T)={v1,v2,v3,v4,v8,} and Leaf(NonCoveredBy(B,T))={v8}. Therefore, if one makes B=B∪Leaf(NonCoveredBy(B,T))={v5,v6,v7,v8,v9}, B becomes complete for T.

Thus embodiments can validate if a set of parts (or end-items) 17 is complete to build a set of subject products 13.

Figure 8A:
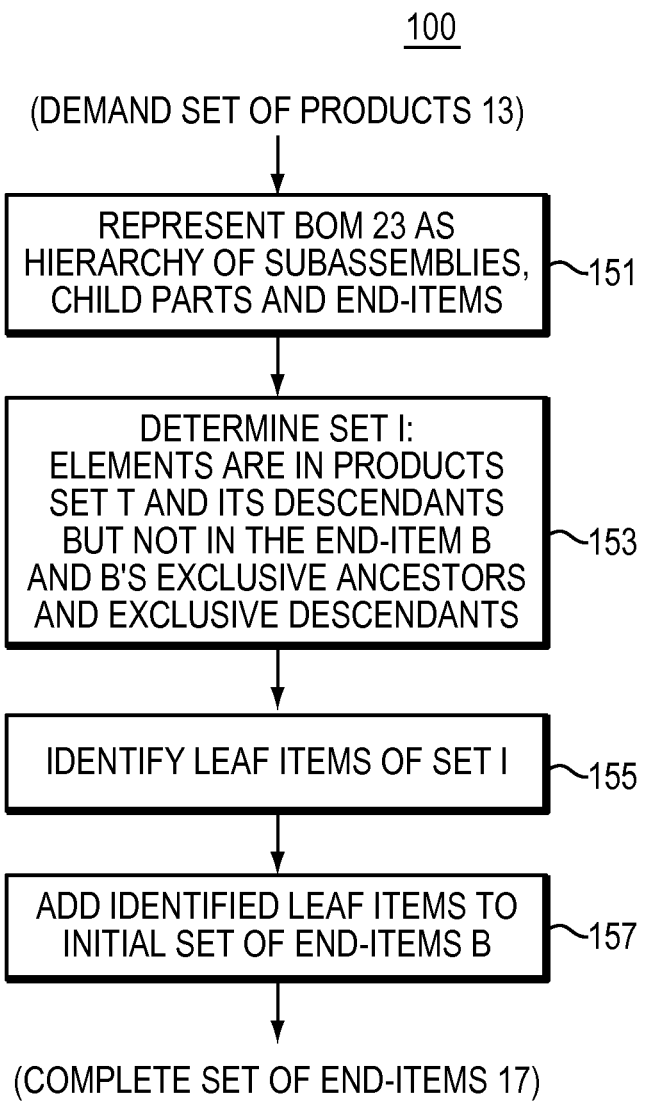
FIGS. 8a-8c are flow diagrams of embodiments.
Figure 8B:
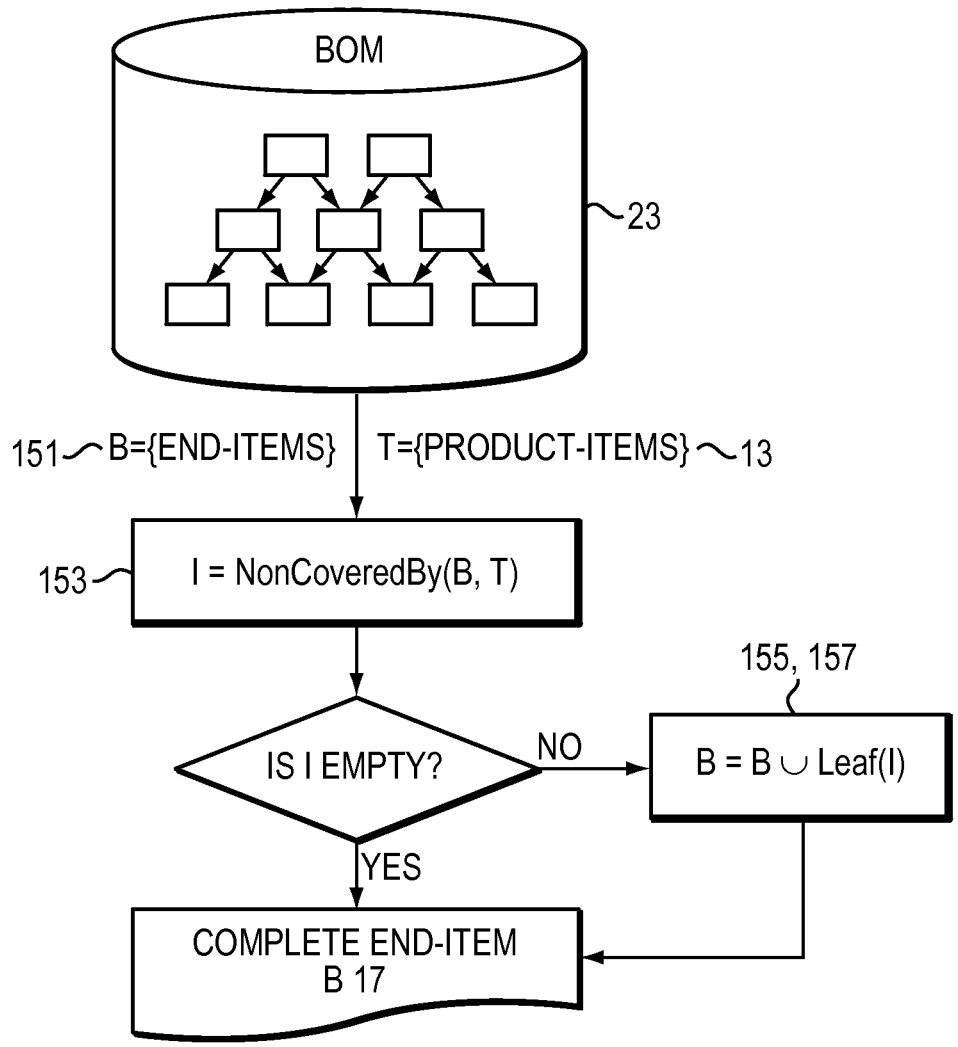

Turning to FIGS. 8a and 8b, embodiments calculate the foregoing to determine (or make) a complete set of end items 17 or to verify completeness of an end-item set 17. To accomplish that, embodiments provide a set completion engine 100 or processor module of a set completion engine 100, or otherwise operative member/unit (each generally 100) of a PLM system 21 (shown in FIG. 1). For a given product order or demand set of products 13, engine 100 at step 151 represents the corresponding BOM 23 of the products 13 as a hierarchy of subassemblies, child parts and end-items. In particular engine 100 at step 151 represents the BOM 23 as an acyclic directed graph. Members (product-items) of the product set T 13 are vertices of the graph. Subassemblies and child parts of the product-items are vertices of the graph. And items in the end-item set B 17 are represented as vertices (i.e., leaf nodes) of the graph.

At step 153, engine 100 determines a Set I for which there are elements of a set T ∪Descendants(T) which are not elements of B ∪ ExclusiveAnces(B) ∪ExclusiveDesc(B). The Set I is mathematically defined above in the discussion of FIG. 7 as $$I = NonCoveredBy(B,T) = (T \cup Descendants(T)) \backslash (B \cup ExclusiveAnces(B) \cup ExclusiveDesc(B))$$

Restated, the Set I is NonCoveredBy(B,T) that is the union set of the set of product-items and the descendent product items which are not elements of (a) the set B of original end-items, and (b) the set of exclusive ancestors to original end-items B, and (c) the set of exclusive descendents to end-items B.

Engine 100 at step 155 identifies leaf items of the resulting Set I of step 153. Next at step 157, engine 100 adds the identified leaf items from step 155 to the initial set B of end-items 17. The resulting set from step 157 is output as the complete set of end-items 17, where engine 100 provides that this complete set B (of end-items 17) becomes complete for T (the requested set of products 13).

In an alternative embodiment, step 155 identifies a subset of the resulting Set I of step 153. Step 157/engine 100 adds the identified subset from step 155 to the initial Set B of end-items 17. The results of step 157 are output as the complete set of end-items 17.

Figure 8C:
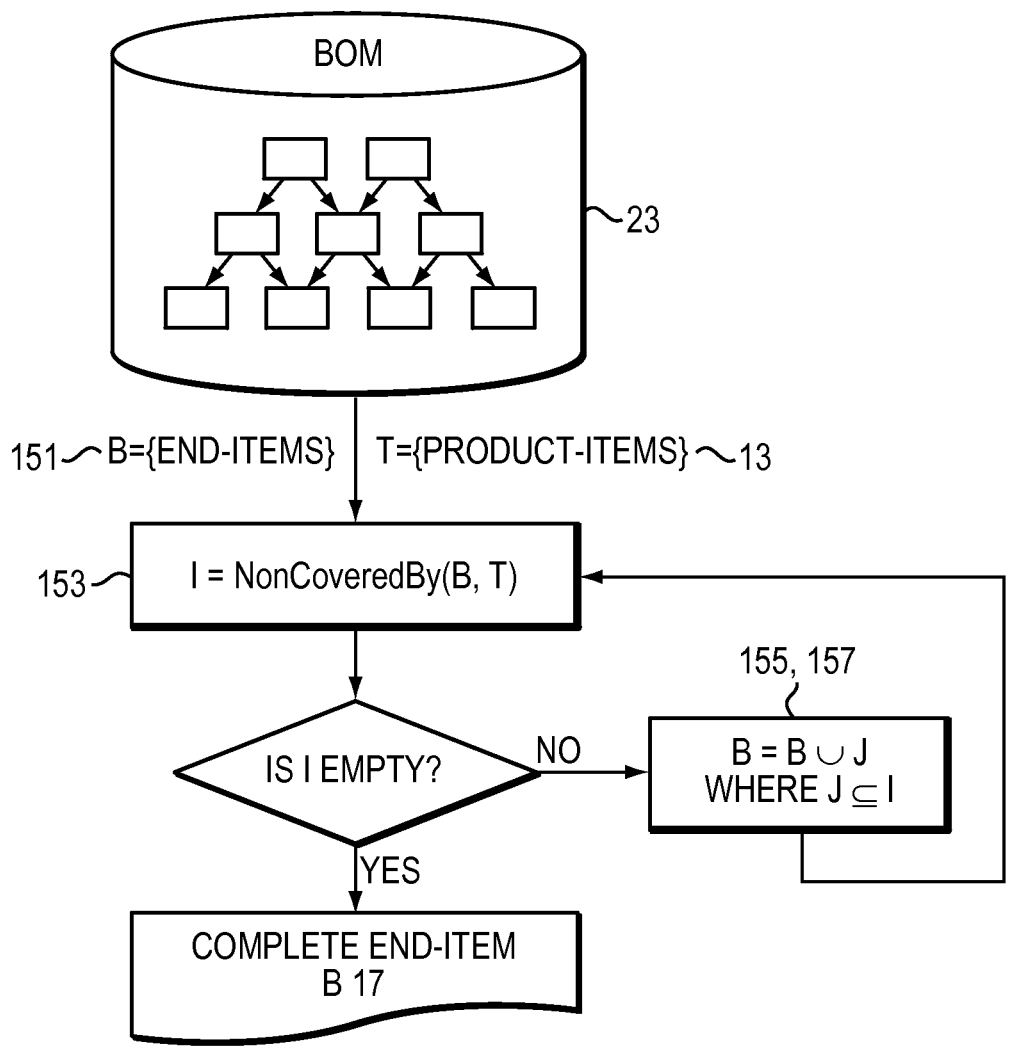

Based on the procedure explained in FIGS. 8a and 8b, one can generalize the procedure as shown in FIG. 8c. The generalization has two characteristics: (1) correction set B of step 155 is performed by adding J that is a subset of or equal to set I (this is a relaxation of Leaf(I) as described alternatively above); and (2) looping from step 157 to step 153 for an iterative improvement. It is fact that the procedure of FIGS. 8a and 8b is an instance of FIG. 8c.

Figure 9:
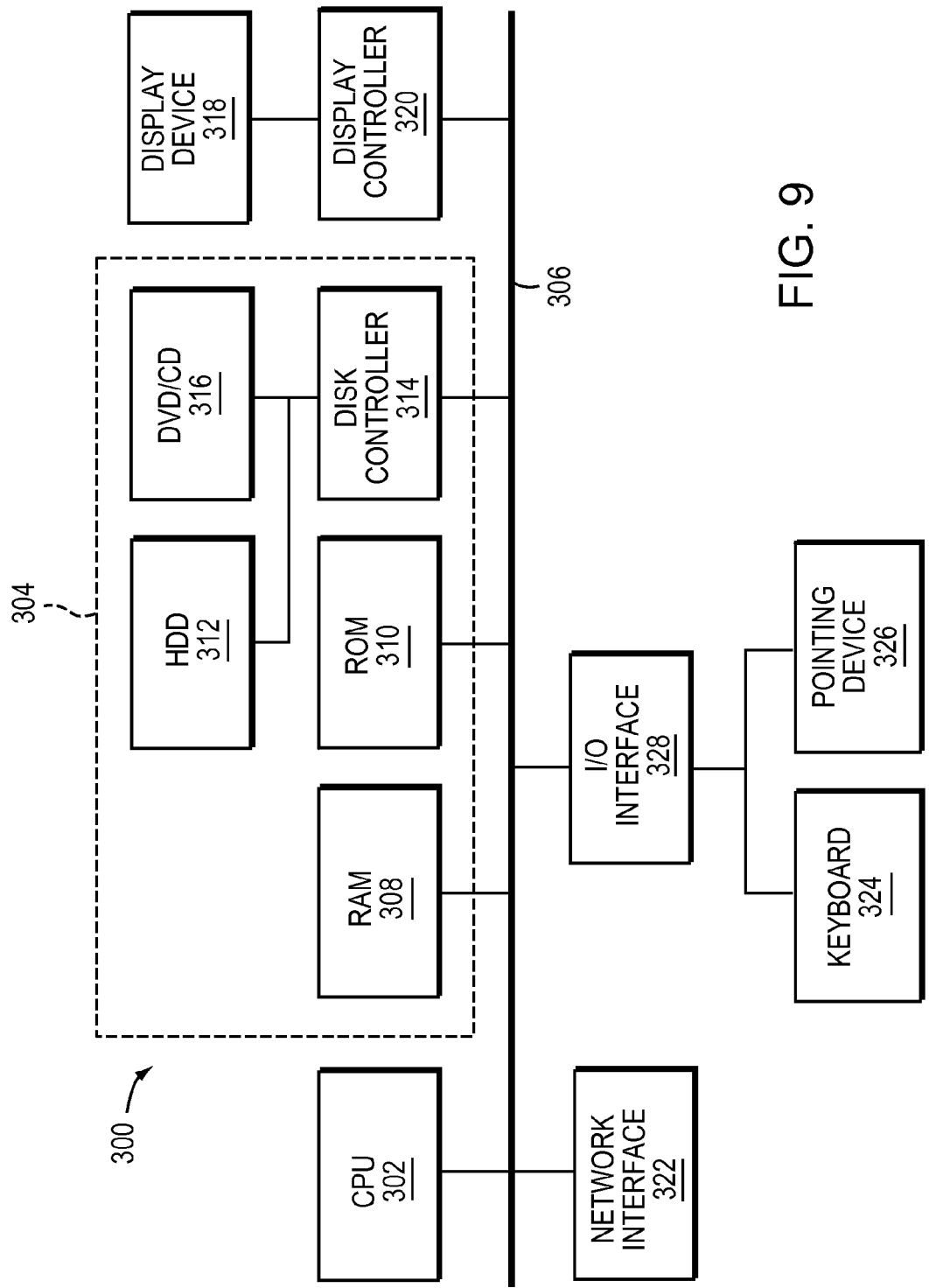
FIGS. 9 and 10 are block and schematic views, respectively, of a computer system and network embodying the present invention.

FIG. 9 is a schematic block diagram of an exemplary computer-aided design station 300, which may also be referred to herein as a computer system. As used herein, the terms "computer-aided design station" and "computer system" refer generally to any suitable computing device that may be used to perform the processes described above and/or any additional processes that may be related to those described above.

In an exemplary embodiment, the computer-aided design station 300 includes one or more processors 302 (CPU) that performs the processes described above and/or any additional processes that may be related to those described above. It should be understood that the term "processor" refers generally to any programmable system including systems and microcontrollers, reduced instruction set circuits (RISC), application-specific integrated circuits (ASIC), programmable logic circuits, and/or any other circuit or processor capable of executing the functions described herein. The above examples are exemplary only and, thus, are not intended to limit in any way the definition and/or meaning of the term "processor."

The steps of the processes described above and/or any additional processes that may be related to those described above may be stored as computer-executable instructions in, for example, a memory area 304 that is operably and/or communicatively coupled to the processor 302 by a system bus 306. A "memory area," as used herein, refers generally to any means of storing program code and instructions executable by one or more processors to aid in automatically determining or validating completeness of end-item sets using a complete-set validation engine or process. The memory area 304 may include one, or more than one, forms of memory. For example, the memory area 304 may include random-access memory (RAM) 308, which can include non-volatile RAM, magnetic RAM, ferroelectric RAM, and/or other forms of RAM. The memory area 304 may also include read-only memory (ROM) 310 and/or flash memory and/or electrically-erasable programmable read-only memory (EEPROM). Any other suitable magnetic, optical, and/or semiconductor memory, such as a hard-disk drive (HDD) 312, by itself or in combination with other forms of memory, may be included in the memory area 304. HDD 312 may also be coupled to a disk controller 314 for use in transmitting and receiving messages to and from processor 302. Moreover, the memory area 304 may also be, or may include, a detachable or removable memory 316, such as a suitable cartridge disk, CD-ROM, DVD, or USB memory. The above examples are exemplary only and, thus, are not intended to limit in any way the definition and/or meaning of the term "memory area."

The computer-aided design station 300 also includes a display device 318 that is coupled, such as operably coupled, to a display controller 320. The display controller 320 receives data via the system bus 306 for display by the display device 318. The display device 318 may be, without limitation, a monitor, a television display, a plasma display, a liquid crystal display (LCD), a display based on light-emitting diodes (LED), a display based on organic LEDs (OLED), a display based on polymer LEDs, a display based on surface-conduction electron emitters, a display including a projected and/or reflected image, or any other suitable electronic device or display mechanism. Moreover, the display device 318 may include a touchscreen with an associated touchscreen controller. The above examples are exemplary only and, thus, are not intended to limit in any way the definition and/or meaning of the term "display device."

In addition, the computer-aided design station 300 includes a network interface 322 for use in communicating with a network (not shown in FIG. 9). Moreover, the computer-aided design station 300 includes one or more input devices, such as a keyboard 324 and/or a pointing device 326, such as a roller ball, mouse, touchpad, and the like. The input devices are coupled to and controlled by an input/output (I/O) interface 328, which is further coupled to the system bus 306.

A description of the general features and functionality of the display device 318, keyboard 324, pointing device 326, as well as the display controller 320, disk controller 314, network interface 322, and I/O interface 328 is omitted herein for brevity as these features are known.

Figure 10:
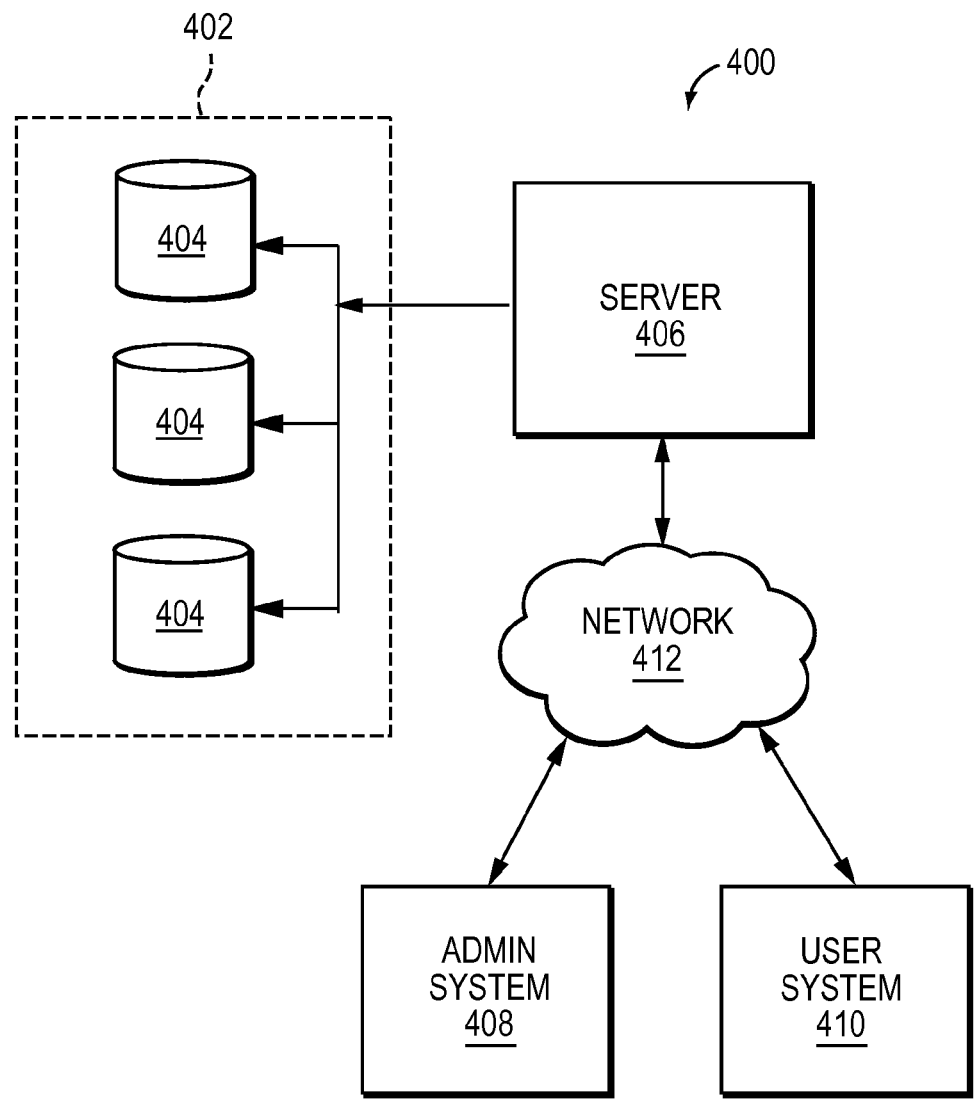

FIG. 10 is a schematic block diagram of an exemplary system 400 for use in computer-aided design of a modeled object, such as the complete set validation processes and engine 100 described above and/or additional processes that may be related to those described above. In an exemplary embodiment, a memory area 402 includes one or more storage devices 404 for use in storing PLM data, such as product item 13 data, end-item 17 data, BOM 23 data and/or complete set validation procedure and/or set completion engine 100. Memory area 402 represents a BOM 23 in a tree-based graph structure as a hierarchy of product-items, subassemblies, child parts and end-items for constructing products in a given set. In some embodiments, the tree-based graph structure is an acyclic directed graph structure.

In some embodiments, the memory area 402 is coupled to a server 406, which is in turn coupled to an administrator system 408 and/or a user system 410 via a network 412. The storage devices 404 may be embodied as one or more databases, may be located at a single or at multiple geographical sites, or may be integrated with the server 406.

As can be appreciated, the network 412 can be a public network, such as the Internet, or a private network such as an LAN or WAN network, or any combination thereof and can also include PSTN or ISDN sub-networks. The network 412 can also be wired, such as an Ethernet network, or can be wireless such as a cellular network including EDGE, 3G and 4G wireless cellular systems. The wireless network can also be WiFi, Bluetooth, or any other wireless form of communication that is known. Thus, the network 412 is merely exemplary and in no way limits the scope of the present advancements.

As one of ordinary skill in the art would recognize, the administrator system 408 and/or the user system 410 can be a computer-aided design station such as the one described above with reference to FIG. 9, or any other computing system that is known. Moreover, it should be understood that the administrator system 408 and/or the user system 410 are configured to perform the processes described above and/or any additional processes that may be related to those described above.

The server 406 stores the computer-readable instructions to execute the processes 100 (FIG. 8) described above and provides these instructions via the network 412 to the administrator system 408 and/or the user system 410. Moreover, the server 406 can also provide data from the memory area 402 as needed to the administrator system 408 and the user system 410. As such, FIG. 10 includes implementations of the system 400 via cloud computing, distributed computing and the like.

Exemplary embodiments of systems, methods, apparatus, computer program products, and non-transitory computer-readable storage media for use in product life cycle management and computer-aided design of a modeled object and product portfolio are described above in detail. The systems, methods, apparatus, computer program products, and computer-readable storage media are not limited to the specific embodiments described herein but, rather, operations of the methods, program products and/or storage media, as well as components of the system and/or apparatus, may be utilized independently and separately from other operations and/or components described herein. Further, the described operations and/or components may also be defined in, or used in combination with, other systems, methods, apparatus, program products and/or storage media, and are not limited to practice with only the systems, methods, apparatus, program products and storage media as described herein.

A computer or computer system, such as those described herein, includes at least one processor or processing unit and a system memory. The computer or computer system typically has at least some form of non-transitory computer readable media. By way of example and not limitation, non-transitory computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present invention is described in connection with an exemplary computer system environment, embodiments of the invention are operational with numerous other general purpose or special purpose computer system environments or configurations. The computer system environment is not intended to suggest any limitation as to the scope of use or functionality of any aspect of the invention. Moreover, the computer system environment should not be interpreted as having any dependency or requirement relating to any one or combination of components illustrated in the exemplary operating environment. Examples of well known computer systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program components or modules, executed by one or more computers or other devices. Aspects of the invention may be implemented with any number and organization of non-transitory components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A computer method of validating end-item completeness for building a product, comprising:

for a given set of products in a PLM system, the given set of products having a corresponding Bill of Material (BOM), representing the BOM in a tree-based graph as a hierarchy of product-items, subassemblies, child parts and end-items for constructing the products in the given set, wherein the tree-based graph represents: (i) the product-items as root nodes and (ii) the subassemblies, the child parts, and the end-items as respective child nodes, such that at least one child node is shared by at least two root nodes each representing a different product;

receiving initial end-items for building at least one product of the given set of products, wherein the initial end-items are a subset of the represented end-items in the graph;

determining a first working set of product items and of end-items not exclusively related to the initial end-items in the graph, the determining performed based on the shared at least one child node, wherein the determining automatically validates that the initial end-items fail to comprise a complete set of end-items for building the at least one product by graphically analyzing exclusive ancestors of the initial end-items, the analyzing includes:

(i) determining a set of exclusive ancestors of the initial end-items by evaluating hierarchical structure associated with the initial end-items in the graph, for each initial end-item, the determining comprising identifying one or more ancestors of the initial end-item based on the respective identified ancestor having one or more children that are each an exclusive ancestor of the initial end-items, the determined set of exclusive ancestors containing the identified one or more ancestors for each initial end-item; and (ii) comparing the product items of the first working set to the determined set of exclusive ancestors, the comparing comprising determining that at least one of the product items of the first working set is not included in the set of exclusive ancestors;

identifying end-items in the first working set that are represented by leaf nodes in the graph;

combining the identified end-items and initial end-items, said combining resulting in generating a complete set of end-items for building the at least one product;

outputting an indication of the complete set, including an indication of the shared at least one child node, in a manner enabling sharing of elements in the PLM system across the given set of products;

responsive to the outputting, building, by the PLM system, the at least one product in a manufacturing simulation by using the outputted indication in the manufacturing simulation to implement manufacturing processes that build the at least one product from the generated complete set of end-items; and performing an operation that facilitates construction of the at least one product based on the generated complete set of end-items.

2. A method as claimed in claim 1 wherein the tree-based graph is an acyclic directed graph.

3. A method as claimed in claim 1 wherein root nodes of the graph represent respective product items of the products in the given set of products.

4. A method as claimed in claim 3 wherein the first working set is determined by an intersection of:

(i) a product item set containing the product items and elements corresponding to descendent nodes of the root nodes representing the product items, and (ii) a difference set containing elements that correspond to nodes of the graph that are not in a union set of the initial end-items, exclusive ancestors of the initial end-items and exclusive descendents of the initial end-items.

5. A method as claimed in claim 1 further comprising using the complete set in purchasing elements for producing the products.

6. A method as claimed in claim 1 wherein the complete set takes into account shared end-items.

7. A method as claimed in claim 1 wherein the graph represents product items as vertices or nodes.

8. A method as claimed in claim 1 wherein the graph represents end-items as vertices and nodes.

9. A computer apparatus for validating end-item completeness for building a product, comprising:

a source of products in a PLM system, for a given set of products in the PLM, the given set of products having a corresponding Bill of Material (BOM);

a memory area operatively coupled to the source and configured to represent the BOM in a tree-based graph structure as a hierarchy of product-items, subassemblies, child parts and end-items for constructing the products of the given set, wherein the tree-based graph represents: (i) the product-items as root nodes and (ii) the subassemblies, the child parts, and the end-items as respective child nodes, such that at least one child node is shared by at least two root nodes each representing a different product; and a complete-set validation engine operatively coupled to the memory area and executable by a processor, the validation engine configured to:

receive initial end-items for building at least one product of the given set of products, wherein the initial end-items are a subset of the represented end-items in the graph;

determine a first working set of product items and of end-items not exclusively related to the initial end-items in the graph, the determining performed based on the shared at least one child node, wherein the determining automatically validates that the initial end-items fail to comprise a complete set of end-items for building the at least one product by graphically analyzing exclusive ancestors of the initial end-items in the graph, the analyzing includes:
(i) determining a set of exclusive ancestors of the initial end-items by evaluating hierarchical structure associated with the initial end-items, for each initial end-item, the determining comprising identifying one or more ancestors of the initial end-item based on the respective identified ancestor having one or more children that are each an exclusive ancestor of the initial end-items, the determined set of exclusive ancestors containing the identified one or more ancestors for each initial end-item; and
(ii) comparing the product items of the first working set to the determined set of exclusive ancestors, the comparing comprising determining that at least one of the product items of the first working set is not included in the set of exclusive ancestors;
identify end-items in the first working set that are represented by leaf nodes in the graph;
combine the identified end-items and initial end-items, said combining resulting in generating a complete set of end-items for building the at least one product;
output an indication of the complete set, including an indication of the shared at least one child node, in a manner enabling sharing of elements in the PLM system across the given set of products;
responsive to the output, build, by the PLM system, the at least one product in a manufacturing simulation by using the outputted indication in the manufacturing simulation to implement manufacturing processes that build the at least one product from the generated complete set of end-items; and
perform an operation that facilitates construction of the at least one product based on the generated complete set of end-items.

10. A computer apparatus as claimed in claim 9 wherein the tree-based graph structure implements an acyclic directed graph.

11. A computer apparatus as claimed in claim 9 wherein root nodes of the graph structure represent respective product items of the products in the given set of products.

12. A computer apparatus as claimed in claim 11 wherein the first working set is determined by an intersection of:
(i) a product item set containing the product items and elements corresponding to descendent nodes of the root nodes representing the product items, and
(ii) a difference set containing elements that correspond to nodes of the graph structure that are not in a union set of the initial end-items, exclusive ancestors of the initial end-items and exclusive descendents of the initial end-items.

13. A computer apparatus as claimed in claim 9 wherein the complete-set validation engine enables a user of the PLM system to use the complete set in purchasing elements for producing the products.

14. A computer apparatus as claimed in claim 9 wherein the complete set takes into account shared end-items.

15. A computer apparatus ads claimed in claim 9 wherein the graph structure represents product items as vertices or nodes.

16. A computer apparatus as claimed in claim 9 wherein the graph structure represents end-items as vertices and nodes.

17. A product lifecycle management (PLM) system comprising:
a memory area storing product data, for a given set of products, there being a corresponding Bill of Materials (BOM), the memory area using a tree-based graph representation of the BOM as a hierarchy of product-items, subassemblies, child parts and end-items, wherein the tree-based graph represents: (i) the product-items as root nodes and (ii) the subassemblies, the child parts, and the end-items as respective child nodes, such that at least one child node is shared by at least two root nodes each representing a different product; and
a processor communicatively coupled to the memory area, the processor validating a complete set of end items by:
receiving initial end-items for building at least one product of the given set of products, wherein the initial end-items are a subset of the represented end-items in the graph;
determining a first working set of product items and of end-items not exclusively related to the initial end-items in the graph, the determining performed based on the shared at least one child node, wherein the determining automatically validates that the initial end-items fail to comprise a complete set of end-items for building the at least one product by graphically analyzing exclusive ancestors of the initial end-items in the graph, the analyzing includes:
(i) determining exclusive ancestors of the initial end-items by evaluating hierarchical structure associated with the initial end-items, for each initial end-item, the determining comprising identifying one or more ancestors of the initial end-item based on the respective identified ancestor having one or more children that are each an exclusive ancestor of the initial end-items, the determined set of exclusive ancestors containing the identified one or more ancestors for each initial end-item; and
(ii) comparing the product items of the first working set to the determined set of exclusive ancestors, the comparing comprising determining that at least one of the product items of the first working set is not included in the set of exclusive ancestors;
identifying end-items in the first working set that are represented by leaf nodes in the graph representation;
combining the identified end-items and initial end-items, said combining resulting in generating a complete set of end-items for building the at least one product;
outputting an indication of the complete set, including an indication of the shared at least one child node, in a manner enabling sharing of elements in the PLM system across the given set of products;
responsive to the outputting, building, by the PLM system, the at least one product in a manufacturing simulation by using the outputted indication, in the manufacturing simulation to implement manufacturing processes that build the at least one product from the generated complete set of end-items; and
performing an operation that facilitates construction of the at least one product based on the generated complete set of end-items.

18. A PLM system as claimed in claim 17 wherein the tree-based graph representation is an acyclic directed graph.

19. A PLM system as claimed in claim 17 wherein root nodes of the graph representation represent respective product items of the products in the given set of products; and
the first working set is determined by an intersection of:
(I) a product item set containing the product items and elements corresponding to descendent nodes of the root nodes representing the product items, and (ii) a difference set containing elements that correspond to nodes of the graph representation that are not in a union set of the initial end-items, exclusive ancestors of the initial end-items and exclusive descendents of the initial end-items.

20. A PLM system as claimed in claim 17 wherein the processor output indication of the complete set enables a user of the PLM system to use the complete set in purchasing elements for producing the products.

* * * * *

UNITED STATES PATENT AND TRADEMARK OFFICE
CERTIFICATE OF CORRECTION

PATENT NO. : 9,898,707 B2
APPLICATION NO. : 14/108023
DATED : February 20, 2018
INVENTOR(S) : Moon Ho Hwang It is certified that error appears in the above-identified patent and that said Letters Patent is hereby corrected as shown below:

In the Claims

Column 14, Line 65, Claim 19, delete "(I)" and insert --(i)--.

Signed and Sealed this
Twenty-second Day of May, 2018

Andrei Iancu
*Director of the United States Patent and Trademark Office*